Jan. 1, 1952 — S. R. GORDON — 2,581,185
COMBINATION LIGHT FIXTURE AND FAN
Filed May 24, 1949 — 2 SHEETS—SHEET 1
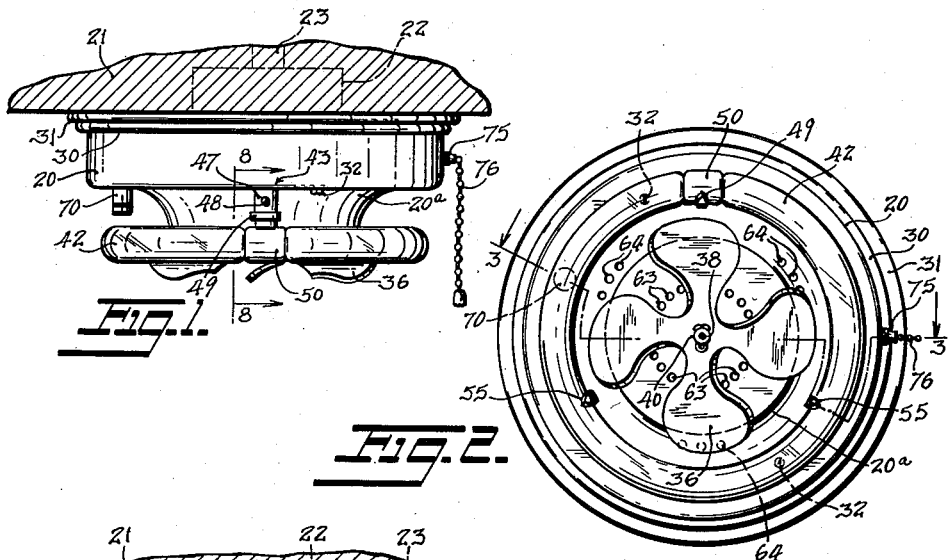
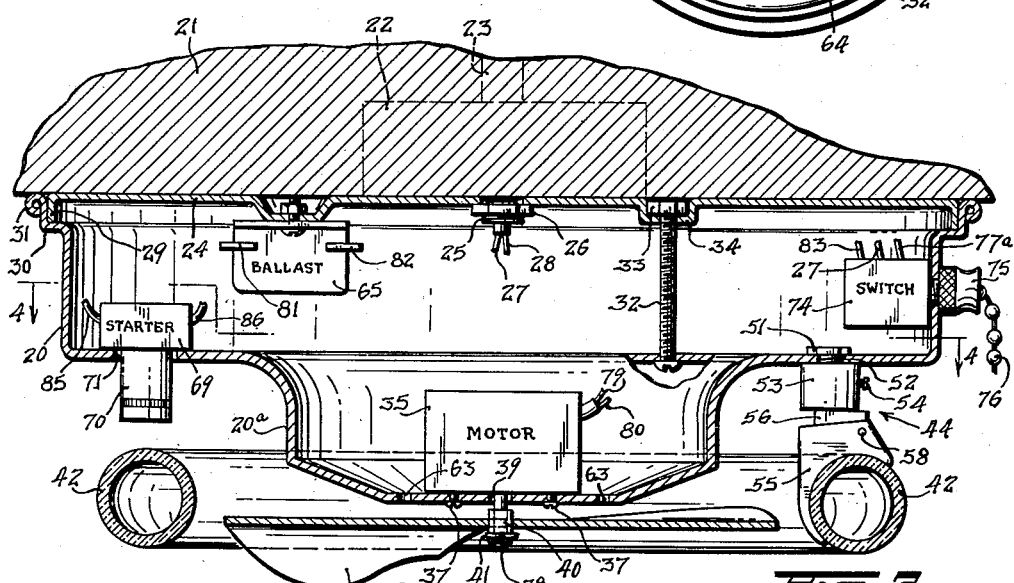
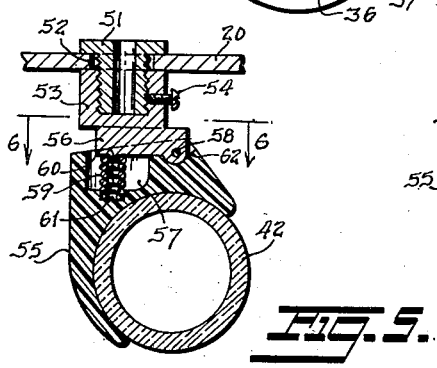
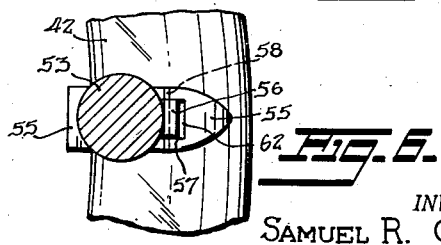
INVENTOR.
SAMUEL R. GORDON
BY
*ATTORNEY*

Jan. 1, 1952   S. R. GORDON   2,581,185
COMBINATION LIGHT FIXTURE AND FAN
Filed May 24, 1949   2 SHEETS—SHEET 2
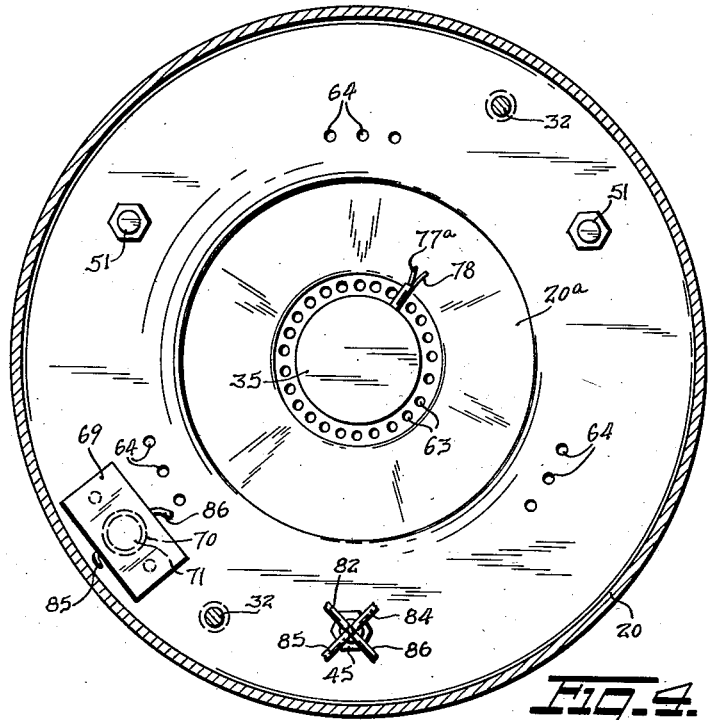
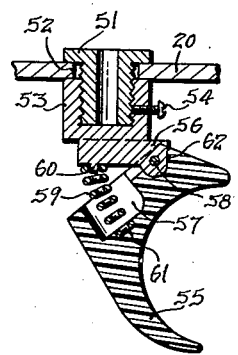
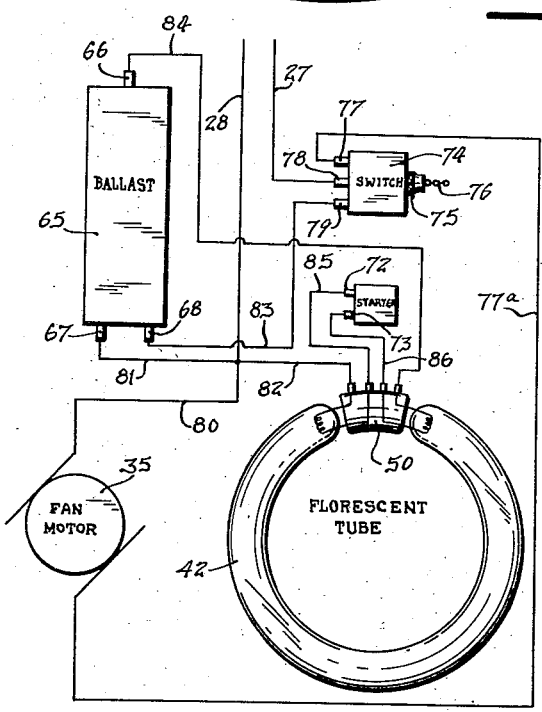
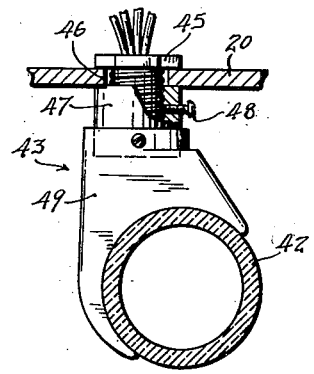
INVENTOR.
SAMUEL R. GORDON
BY
ATTORNEY Patented Jan. 1, 1952

2,581,185

UNITED STATES PATENT OFFICE 2,581,185

COMBINATION LIGHT FIXTURE AND FAN

Samuel R. Gordon, New York, N. Y.

Application May 24, 1949, Serial No. 94,960

2 Claims. (Cl. 230—249.5)

This invention relates to new and useful improvements in a ceiling-type lighting fixture.

More particularly, the present invention proposes the construction of a lighting fixture incorporating a lamp and a fan in a manner to provide illumination and to circulate the air in the room provided with the new fixture.

Another object of the present invention proposes characterizing the lighting fixture by a hollow housing to be supported from a ceiling with a small electric motor mounted on the inside of the housing in a manner to drive an external fan blade.

A further object of the present invention proposes mounting the fan blade on the center of the housing and to provide a lamp in the form of a circular fluorescent tube encircling the fan blade in a manner so that the tube in addition to providing illumination acts as a guard for the fan blade.

Still another object of the present invention proposes mounting the fan motor within a downwardly projected portion of the housing which is arranged concentric with the circular fluorescent tube in a manner so that the fan blade will be supported at substantially the same level as the tube to be encircled thereby.

The invention further proposes mounting the motor of the fan and the fluorescent tube in a circuit controlled by a single switch in a manner so that the lamp may be lit independently, so that the fan may be operating independently, so that both the lamp and the fan may be on at the same time or so that both the lamp and the fan may be off at the same time.

A still further object of the present invention proposes the provision of novel clips on the housing for supporting the fluorescent tube and from which the tube can be conveniently released when it is desired to change tubes or for other purposes.

It is a further object of the present invention to construct a ceiling-type lighting fixture which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of the ceiling-type lighting fixture constructed in accordance with the present invention.

Fig. 2 is a bottom plan view of Fig. 1.

Fig. 3 is an enlarged vertical sectional view taken substantially on the line 3—3 of Fig. 2.

Fig. 4 is a reduced horizontal sectional view taken on the line 4—4 of Fig. 3.

Fig. 5 is an enlarged detailed sectional view of a portion of Fig. 3.

Fig. 6 is a horizontal sectional view taken on the line 6—6 of Fig. 5.

Fig. 7 is a view similar to Fig. 5, but illustrating a different position of the parts.

Fig. 8 is an enlarged partial vertical sectional view taken on the line 8—8 of Fig. 1.

Fig. 9 is a schematic wiring diagram of the lighting fixture.

The ceiling-type lighting fixture, according to the present invention, includes a hollow housing 20 which is to be supported from a ceiling 21. Mounted in the ceiling 21 there is the usual junction box 22 entered by the usual armored cable 23 connected to a source of electrical current, not shown. The hollow housing 20 has an open top closed by a cover 24. The junction box 22 has the usual depending threaded tubular stud 25 which passes through a concentric opening formed in the cover 24 and to which the cover is secured by a nut 26, see especially Fig. 3. The tubular stud 25 provides an entrance for the leads 27 and 28 from the armored cable 23 to supply all of the electric current required by the lighting fixture.

The outer periphery of the cover 24 is formed with a narrow depending circular flange 29 which seats on a circular shoulder 30 formed on the housing 20. Above the shoulder 30, the housing 20 is finished by a circular bead 31 which engages the face of the ceiling 21. The housing 20 is secured to the cover 24 by several screws 32 which are extended upward through openings formed in the housing and which threadedly engage complementary nuts 33 mounted on the cover 24. The nuts 33 are fixedly mounted in downwardly extended depressions 34 formed in the cover 24 so that the top face of the cover will fit flush against the face of the ceiling 21.

A fan is mounted on the housing 20 and includes an internal motor 35 and an external fan blade 36. The motor 35 is concentrically mounted within the housing 20 by several screws 37 and has a driven shaft 38 extended through an opening 39 formed in the housing 20. The fan blade 36 has a concentric tubular hub 40 which sleeves the projected end of the driven shaft 38 and which is fixedly secured thereto for rotation therewith by a cotter pin 41.

A lamp in the form of a fluorescent tube 42 is mounted on the housing 20. The tube 42 is supported on the housing by one stationary clip 43 and two movable clips 44 so as to encircle the fan blade 36. Thus, the tube 42 in addition to being a source of illumination, when needed, also functions as a guard for the revolving fan blade 36 eliminating the need for any encumbering guard structure and results in a device which in addition to being practical is neat in appearance. So that the fan blade 36 and the fluorescent tube 42 will be supported by the housing 20 at the same level, the motor 35 for the fan is mounted within a downwardly extended projection 20a formed on the housing 20 concentric with the tube 42. The clips 43 and 44 for supporting the tube 42 are mounted on the bottom wall of the housing 20 evenly spaced about the downwardly extended projection 20a, as shown in Figs. 2 and 4.

The stationary clip 43, which provides all of the electrical connections for the fluorescent tube 42, includes a tubular threaded nipple 45, see Fig. 8, which is passed through a complementary hole 46 formed in the housing 20. The free end of the nipple 45 is threaded into a short tubular sleeve 47 and the sleeve 47 is retained against accidental movement relative to the nipple 45 by a set screw 48. Fixedly mounted on the sleeve 47 there is a half-round claw 49 which opens outward to receive the center connector 50 of the fluorescent tube 42. As is known in the field to which the present invention pertains, the center connector 50 carries four small metallic prongs, not shown, and the claw 49 is formed of insulation material, preferably a resinous plastic material, and is provided with four complementary metallic sockets, not shown. The metallic prongs of the connector 50 are received in the metallic sockets and the sockets are in turn connected in an electric circuit, to be hereinafter described, for supplying the required electricity to illuminate the tube 42 when desired. The leads of the electrical circuit for connection with the metallic sockets of the claw 59 come from the interior of the housing 20 and are extended downward through the nipple 45, as shown in Fig. 8, and the sleeve 47 into the claw 49 where they are connected with the sockets.

Each of the movable clips 44 is alike in construction and details of their construction are shown in Figs. 5 to 7. Each movable clip 44 includes a threaded nipple 51 which is extended downward through an opening 52 formed in the housing 22 and threadedly received in a metallic member 53 and secured thereto against movement by a set screw 54. A claw 55 of resinous plastic material is pivotally mounted on the metallic member 53, to have the tube 42 received therein as shown in Figs. 3 and 5. The metallic member 53 is formed with a depending projection 56 received in a complementary recess 57 formed in the top of the claw 55. A pin 58 passes through the top of the claw 55 and the projection 56 pivotally connecting the claw 55 to the projection 56. An expansion spring 59 has its top end surrounding a depending stud 60 integrally formed with the metallic member 53 and its bottom end received in a downward extension 61 of the recess 57, as clearly shown in Figs. 5 and 7.

The spring 59 functions to turn the claw 55 about the pivot pin 58 so that the claw will tightly bear against the inner periphery of the tube 42 and securely retain those parts against vibrations set up by the motor 35 when the fan is in operation. When the tube 42 is disconnected from the clips 43 and 44, the springs 59 of the movable clips 44 will turn the respective claws 55 outward, as shown in Fig. 7. Pivotal movement of the claws 55, under influence of the springs 59 will be arrested by the engagement of the end walls 62 of the recesses 57 against the adjacent ends of the projections 56, as clearly shown in Fig. 7.

The housing 20 is formed with a set of ventilation openings 63 which surround the motor 35 and further ventilation openings 64 at points removed from the motor 35. The openings 63 and 64 insure an adequate circulation of air through the housing 20 to cool the motor 35.

Suitably secured to the inside of the top face of the cover 24 there is the usual ballast 65 required in the operation of fluorescent tubes. As shown in Fig. 9, the ballast 65 is formed with a single contact 66 at one end and a pair of contacts 67 and 68 at its other end. Also mounted with the housing 20 there is the usual base 69 to which the usual starter 70 is connected through an opening 71 formed in the housing 20. The starter 70 can be conveniently removed and replaced when the tube 42 is removed from its supporting clips 43 and 44. As shown in Fig. 9, the base 69 of the starter has a pair of contacts 72 and 73.

Mounted within the housing 20 there is a switch 74 having a portion 75 mounted through the housing 20 and from which the usual pull chain 76 extends. As shown in Fig. 9, the switch 74 has three contacts 77, 78 and 79. The switch 74 is of the type having four positions—one position in which both the motor 35 and the lamp 42 are off, one position in which only the motor 35 is energized to rotate the fan blade 36, one position in which only the lamp 42 is illuminated and one position in which both the motor 35 and the lamp 42 will be on. Those positions of the switch 74 are controlled by successive pullings of the pull chain 76.

Details of the circuit for the fan motor 35 and the fluorescent tube 42 are shown in Fig. 9. The main lead 27 of the pair of leads from the junction box 22 is connected to the contact 78 of the switch 74. A lead 77a connects the contact 77 of the switch 74 with the motor 35. A branch lead 80 from the main lead 28 is connected to the other side of the motor 35 so that when the contacts 77 and 78 of the switch 74 are bridged the motor 35 will be energized to rotate the fan blade 36.

The circuit for the fluorescent tube 42 includes a branch lead 81 from the main lead 28 to the contact 67 of the ballast 65. A second branch lead 82 from the main lead 28 is connected to one of the end prongs of the tube 42. A lead 83 connects the contact 68 of the ballast 65 with the contact 79 of the switch 74. A lead 84 connects the contact 66 of the ballast 65 to the other end prong of the tube 42. The two center prongs of the tube 42 are respectively connected to the contacts 72 and 73 of the starter 70 by leads 85 and 86. Thus, whenever the contacts 78 and 79 of the switch 74 are bridged, the fluorescent tube 42 will be illuminated.

Further details of the ballast 65, the starter 70 and the switch 74 will not be given in this specification as such details form no part of the present invention and such details are generally known by those skilled in the art to which the present invention pertains From the foregoing description it will be apparent that a novel lighting fixture is proposed in which the fluorescent tube serves the dual function of providing illumination and acting as a guard for the rotating fan blade 36. Such fluorescent tubes while they do not become hot in operation do warm up and that warmth when contacted by the hand or other part of the body will effectively serve to warn the person that he is approaching the proximity of the revolving fan blade 36 and that care should be exercised to avoid injury.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A ceiling-type lighting fixture comprising a hollow housing to be supported from a ceiling, a fan blade rotatively supported beneath said housing, and a lamp mounted on said housing, said fan blade being positioned at the center of said housing, said lamp being in the form of a circular fluorescent tube mounted horizontally on said housing on the same level as said fan blade and concentric with said fan blade to encircle said fan blade forming a guard for said fan blade.

2. A ceiling-type lighting fixture comprising a hollow housing to be supported from a ceiling, a fan mounted on said housing and including an external motor driven fan blade, and a lamp mounted on said housing, said fan blade being postioned at the center of said housing, said lamp being in the form of a circular fluorescent tube encircling said fan blade forming a guard for said fan blade, said fan including a motor within said housing for driving said fan blade, said motor being mounted within a downwardly projected portion of said housing arranged concentric with said circular fluorescent tube so that said fan blade will be supported at substantially the same level as said tube to be encircled thereby and a circuit connecting a four position switch to said motor and said lamp so that said lamp may be independently lit, so that said motor may be independently energized, so that said motor and said lamp may be on simultaneously or so that said motor and said lamp may be off simultaneously.

SAMUEL R. GORDON.

REFERENCES CITED

The following references are of record in the file of this patent:

UNITED STATES PATENTS

| Number | Name | Date |
|---|---|---|
| D. 85,444 | Primakow | Oct. 27, 1931 |
| 2,359,021 | Campbell et al. | Sept. 26, 1944 |
| 2,454,243 | Wiedenhoeft | Nov. 16, 1948 |

FOREIGN PATENTS

| Number | Country | Date |
|---|---|---|
| 456,372 | Germany | Feb. 2, 1928 |